United States Patent [19]
Yagi et al.

[11] Patent Number: 5,506,626
[45] Date of Patent: Apr. 9, 1996

[54] CLOSED-CAPTION DECODER CIRCUIT HAVING ROBUST SYNCHRONIZATION FEATURES

[75] Inventors: Yukihiro Yagi, Kyoto; Masayuki Nakaimuki, Takatsuki, both of Japan; Shinichi Takahashi, Milton; Jeff M. Huard, Puyallup, both of Wash.

[73] Assignee: Matsushita Electric Industrial Co., Ltd., Osaka, Japan

[21] Appl. No.: 181,985

[22] Filed: Jan. 14, 1994

[51] Int. Cl.$^6$ .................................................. H04N 7/08
[52] U.S. Cl. .......................... 348/464; 348/468; 348/478; 348/563
[58] Field of Search ................... 348/464, 468, 348/500, 473, 478, 565, 563, 569; H04N 7/08

[56] References Cited

U.S. PATENT DOCUMENTS

| | | | |
|---|---|---|---|
| 4,614,971 | 9/1986 | Maney | 348/478 |
| 4,626,913 | 12/1986 | Gurumurthy | 348/478 |
| 5,223,930 | 6/1993 | Zato | 348/478 |
| 5,343,239 | 8/1994 | Lappington | 348/478 |

OTHER PUBLICATIONS

Proprietary Document: CCD 3000/LN21, "One-chip Closed–Caption Decoder," pp. 1–7, 20–25.
Proprietary Document: CCU 3005, Central Control Unit, preliminary, ITT Semiconductors, pp. 1–18, 51–52, Aug. 20, 1992 Edition.
Proprietary Document: "Closed–Caption Decoder" CMOS; Motorola Semiconductor Technical Data; MC144143; Jan. 11, 1991; pp. 1–18.
"Z86128 Line 21 Closed Caption Controller (L21C)"; from ZILOG Prelininary Product Specification; Mar. 1991; 11 pages.
"LSI Chip Set for Closed Caption Decoder System"; by Masami Harigai et al.; from IEEE Transactions on Consumer Electronics, vol. 37, No. 3, Aug. 1991. pp. 449–454.
"Microcontrollers for Closed Caption System"; by Hiroyasu Shindo et al.; from IEEE; vol. 38, No. 3, Aug. 1992; pp. 268–272.
"A Single Chip Line 21 Captioning Decoder"; by N. F. Hurley; from IEEE, vol. 38, No. 3, Aug. 1992; pp. 261–267.
"A Single Chip Solution for Closed Caption Decoding"; by U. Moller et al.; from IEEE; vol. 38 No. 3, Aug. 1992; pp. 274–278.
"Closed Captioning with the Motorola 68HC05CC1"; by Janice Benzel et al.; from The Computer Applications Journal; Issue #34 May 993; pp. 12–16, 18–19, 22–24.

*Primary Examiner*—James J. Groody
*Assistant Examiner*—Sherrie Hsia
*Attorney, Agent, or Firm*—Ratner & Prestia

[57] ABSTRACT

A closed-caption decoder which uses separate clock generators to produce the sampling frequencies for the clock run-in signal and the data portion of the closed-caption signal. Each of the clock generators generates its signal from a common 12 MHz reference clock signal. The timing of the sampling clock signal for the closed-caption data is advanced at the start of the sampling interval to reduce the total timing errors in the sampling of the closed-caption data. Additionally, the decoder can adaptively select one of four edges of the clock run-in signal to use as its synchronizing reference. Furthermore, the decoder may be adapted to recognize more than one start byte pattern.

13 Claims, 10 Drawing Sheets

| SAMPLE # | 1 | 2 | 3 | 4 | 5 | 6 | 7 | 8 |
|---|---|---|---|---|---|---|---|---|
| CENTER (us) | 0.497 | 1.490 | 2.483 | 3.476 | 4.469 | 5.462 | 6.455 | 7.448 |
| SAMPLE TIME DIFFERENCE | 0.458 -3.9% | 1.458 -3.2% | 2.458 -2.5% | 3.458 -1.8% | 4.458 -1.1% | 5.458 -0.4% | 6.458 0.3% | 7.458 1.0% |

| SAMPLE # | 11 | 12 | 13 | 14 | 15 | 16 | 17 | 18 |
|---|---|---|---|---|---|---|---|---|
| CENTER (us) | 10.427 | 11.420 | 12.413 | 13.406 | 14.400 | 15.393 | 16.386 | 17.379 |
| SAMPLE TIME DIFFERENCE | 10.458 3.1% | 11.458 3.8% | 12.458 4.5% | 13.458 5.2% | 14.458 5.8% | 15.458 6.5% | 16.458 7.3% | 17.458 8.0% |

FIG. 8a

| SAMPLE # | 1 | 2 | 3 | 4 | 5 | 6 | 7 | 8 |
|---|---|---|---|---|---|---|---|---|
| CENTER (us) | 19.861 | 21.848 | 23.834 | 25.820 | 27.806 | 29.792 | 31.778 | 33.764 |
| SAMPLE TIME DIFFERENCE | 10.791 -3.5% | 21.791 -2.9% | 23.791 -2.2% | 25.791 -1.5% | 27.791 -0.8% | 29.791 0.0% | 31.791 0.7% | 33.791 1.4% |

| SAMPLE # | 9 | 10 | 11 | 12 | 13 | 14 | 15 | 16 |
|---|---|---|---|---|---|---|---|---|
| CENTER (us) | 35.751 | 37.737 | 39.723 | 41.709 | 43.695 | 45.681 | 47.667 | 48.654 |
| SAMPLE TIME DIFFERENCE | 35.791 2.0% | 37.791 2.7% | 39.791 3.4% | 41.791 4.1% | 43.791 4.8% | 45.791 5.5% | 47.791 6.3% | 49.791 6.9% |

FIG. 8b

| SAMPLE # | 1 | 2 | 3 | 4 | 5 | 6 | 7 | 8 |
|---|---|---|---|---|---|---|---|---|
| CENTER (us) | 19.861 | 21.848 | 23.834 | 25.820 | 27.806 | 29.792 | 31.778 | 33.764 |
| SAMPLE TIME DIFFERENCE | 19.958 4.9% | 21.958 5.5% | 23.858 6.2% | 25.958 6.9% | 27.958 7.6% | 29.958 8.4% | 31.958 9.1% | 33.958 9.8% |

| SAMPLE # | 9 | 10 | 11 | 12 | 13 | 14 | 15 | 16 |
|---|---|---|---|---|---|---|---|---|
| CENTER (us) | 35.751 | 37.737 | 39.723 | 41.709 | 43.695 | 45.681 | 47.667 | 49.654 |
| SAMPLE TIME DIFFERENCE | 35.958 10.4% | 37.958 11.1% | 39.958 11.8% | 41.958 12.5% | 43.958 13.2% | 45.958 13.9% | 47.958 14.7% | 49.958 15.3% |

CLOSED-CAPTION DECODER CIRCUIT HAVING ROBUST SYNCHRONIZATION FEATURES

BACKGROUND OF THE INVENTION

The present invention concerns circuitry for decoding closed-caption information from television signals and more particularly to such circuitry having synchronization features which allow it to operate effectively even in the presence of signal noise.

As of Jul. 1, 1993 every television set sold in the United States having a screen larger than 13" must be capable of decoding and displaying closed-caption information.

Under the standards approved by the Federal Communications Commission (FCC), closed-caption information is text representing dialog or narration from a television program which is encoded in the video portion of the television signal. Two characters of information are transmitted during each image frame, for a data rate of 60 characters per second. Under the present standard, this information is digitally encoded in line 21 of the vertical blanking interval of the odd field of each frame of the video signal.

Figure 3:
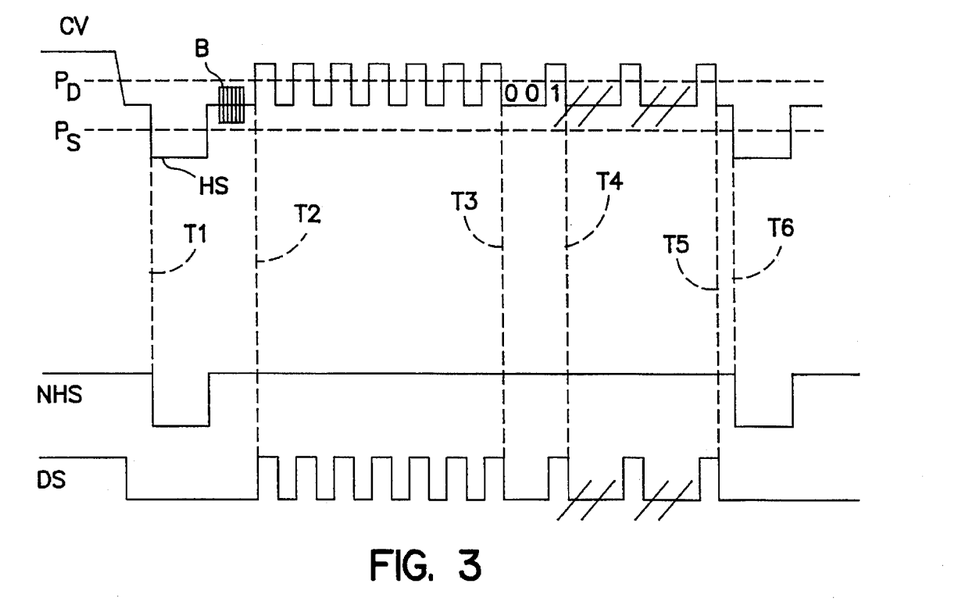
FIG. 3 is a timing diagram which is useful for explaining the operation of the closed-caption decoder shown in FIG. 1.

FIG. 3 is a timing diagram which illustrates the format of line 21 of the odd field. The line includes a horizontal sync pulse (HS), a color reference burst signal, B, seven cycles of a clock run-in signal, a start byte pattern and two bytes of closed-caption data. In FIG. 3, the center of the leading edge of the horizontal sync pulse HS occurs at time T1. The first pulse of the run-in clock occurs at time T2 and the last pulse occurs at time T3. The start byte pattern in this case, b'100' (where the "b" indicates binary notation), is sent least significant bit (LSB) to most significant bit (MSB) between times T3 and T4. The two data bytes are sent between times T4 and T5. The byte beginning at time T4 is, by definition, the less significant byte while the byte ending at time T5 is the more significant byte. In FIG. 3, time T6 marks the beginning of the horizontal sync pulse for line 22.

Each of the data bytes which make up the closed-caption data are eight bits in length with seven bits being for data and the eighth bit being a parity bit. The data bits are sent using a non-return to zero (NRZ) code.

Existing closed-caption decoders recover the data bytes from each frame and display the resulting text in a small window anywhere (e.g., near the bottom) of the image.

The data portion of this signal is desirably sampled at certain predefined instants to ensure that the character data is accurately recovered. Under the FCC closed-caption standard, the NRZ coded data bits are serially transmitted with a sample frequency of 503,488 Hz (hereinafter 503 KHz). This frequency is 32 times the frequency of the horizontal line scanning signal (32 H).

Many prior art closed-caption coding systems use a phase locked loop to produce the 503 KHz clock. An exemplary system of this type is described in an article by M. Harigai et al. entitled "LSI Chip set for closed Caption Decoder System", *IEEE Transactions on Consumer Electronics*, vol. 37, no. 3, pp. 449–454 (August 1991). This system employs two nested phase lock loops (PLLs). The inner PLL locks a voltage control oscillator (VCO) to a frequency which is 32 times the horizontal line sampling frequency. The outer PLL is responsive to the recovered clock run-in pulses to shift the phase of the 32 H clock signal to match the sampling phase indicated by the clock run-in signal.

Circuits of this type which employ PLLs for synchronization have several disadvantages. First, the sampling clock can be misaligned if the signal is contaminated with multi-path distortion (ghosts). Second, the phase locked loop circuitry and phase shift circuitry can add to the complexity of the decoder, making it more expensive to produce than a decoder which does not employ phase locked loops. Third, noise in one pulse of the run-in clock signal may cause a synchronization error resulting in errors in the recovered data. Finally, it may be difficult to synchronize the decoder to the display processor unless the clock signal for the display processor is at a frequency related to the frequency of the close caption data sampling clock.

Another type of system uses a digital phase lock loop to generate the sampling clock signal. This system is described in a paper by U. Moller et al. entitled "A Single Chip Solution for Closed-Caption Decoding", *IEEE Transactions on Consumer Electronics*, vol. 38, no. 3, pp. 274–278 (August 1992). In this system a 12 MHz clock signal is alternately divided by five and by seven to produce a signal which has an average frequency of 2.013952 MHz. This frequency is four times the sampling frequency of the closed-caption data. The closed-caption decoder described in this paper over-samples the closed-caption data on line 21 by a factor of four and uses a majority count decision mechanism to determine the state of the individual bits; three of four samples at one logic level produces an output sample at that logic level.

This circuitry requires a relatively large state machine to correlate the sampling frequency to the data being sampled. This state machine must also include features which allow the signal to be recovered properly in the presence of noise. These features add to the expense of the closed caption decoder.

SUMMARY OF THE INVENTION

The present invention is embodied in closed-caption decoder circuitry which uses separate clock generators to produce the sampling frequencies for the clock run-in signal and the data portion of the closed-caption signal. Each of the clock generators generates its signal from a common 12 MHz reference clock signal.

According to another aspect of the invention, the timing of the sampling clock signal for the closed-caption data is advanced at the start of the sampling interval to reduce the total timing errors in the sampling of the closed-caption data.

According to still another aspect of the invention, the decoder adaptively selects one of four edges of the clock run-in signal to use as its synchronizing reference.

According to yet another aspect of the invention, the closed-caption decoder may be adapted to recognize more than one start byte pattern.

DETAILED DESCRIPTION

Overview

Figure 1:
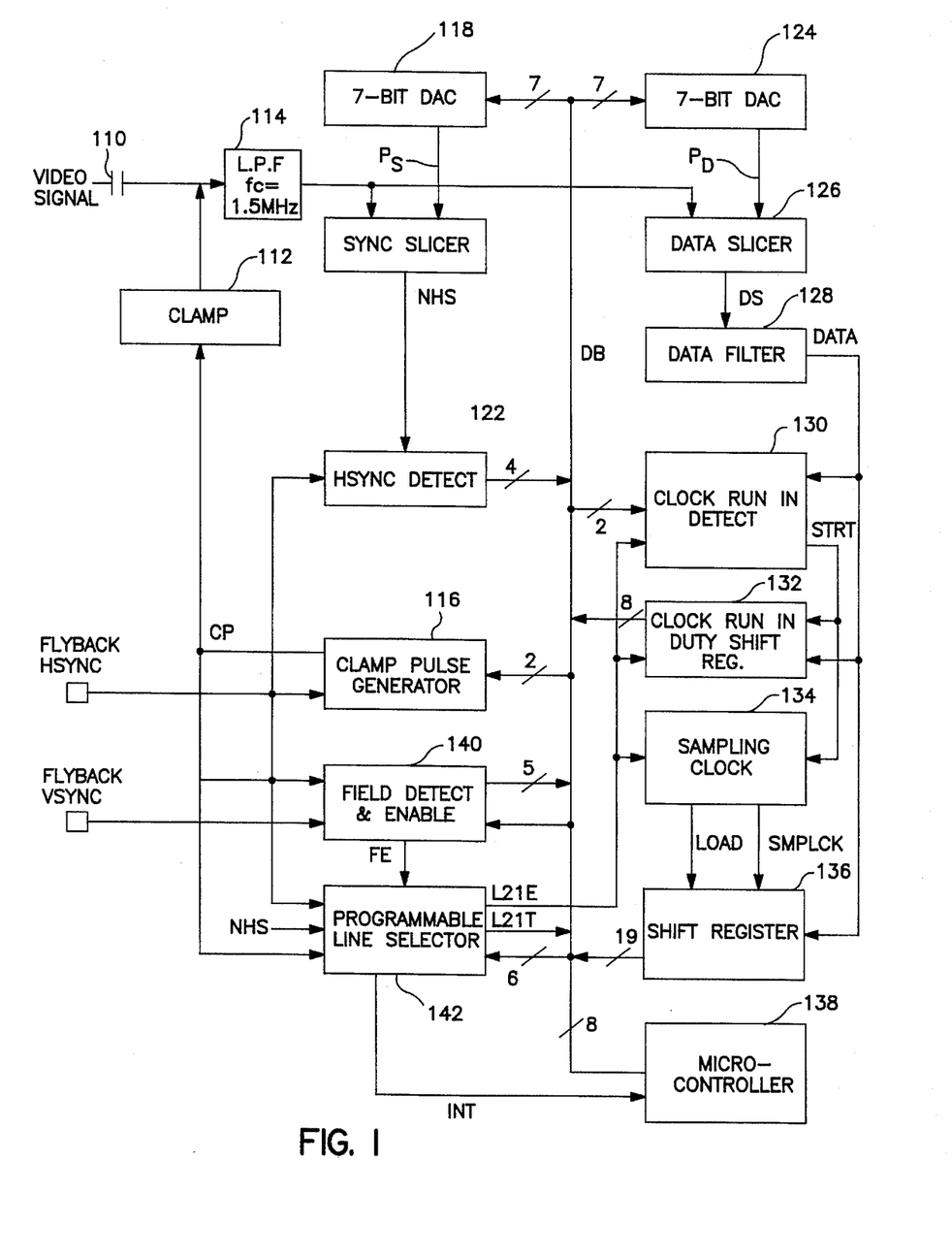
FIG. 1 is a block diagram of a closed caption decoder system in accordance with the present invention.

FIG. 1 is a block diagram of circuitry suitable for use as a closed-caption decoder. The circuitry is coupled to receive a baseband video signal at a capacitor 110, a flyback horizontal sync (Flyback HSYNC) signal, and a flyback vertical sync (Flyback VSYNC) signal from the television receiver. The circuitry is also coupled to a microcontroller 138 which controls several functions of the television receiver, for example, volume and color control settings and channel selection.

Briefly, the circuitry shown in FIG. 1 extracts the horizontal synchronization signal information from the composite video signal and uses this information along with the Flyback HSYNC signal and the Flyback VSYNC signal and the 12 MHz clock signal of the microcontroller 138 to generate suitable timing signals.

Based on these timing signals, the circuitry separates the clock run-in signal and the closed-caption data signal from the composite video signal. The closed-caption data is stored in a shift register 136, which is coupled to the microcontroller 138 after both the less significant byte and the more significant byte have been obtained.

Two key timing signals used by the circuitry shown in FIG. 1 are the sampling clock signals which are used to sample the clock run-in signal and sample the closed-caption data in the sampling clock generator circuitry 134. These signals are generated by separate circuitry. Both signals, however, are derived from the 12 MHz clock signal applied to the microcontroller 138. These signals are synchronized to the incoming data stream by fixed delays relative to the leading edge of the horizontal sync pulse. This method of synchronization reduces the complexity of the system relative to a system which uses phase-locked loops to regenerate the sampling signals.

DETAILED DESCRIPTION OF THE EXEMPLARY EMBODIMENT

In FIG. 1, the composite video signal is AC coupled to the closed-caption decoding circuitry through the capacitor 110.

In the exemplary embodiment of the invention, this capacitor has a capacitance of 1 microfarad. The AC signal provided by the capacitor 110 is shifted such that the blanking level is at +2 volts by the action of clamp circuitry 112. In the exemplary embodiment of the invention, the clamp 112 may be a capacitor which is charged, during the blanking interval, by a clamp pulse signal (CP) provided by clamp pulse generator 116.

The clamped composite video signal is applied to a low-pass filter 114 which selectively attenuates signal components having frequencies greater than 1.5 MHz. This filter substantially eliminates chrominance components, including the color reference burst component, from the composite video signal.

The filtered composite video signal is then applied to a synchronization signal slicer 120 and to a data signal slicer 126. Each of the slicers 120 and 126 may be, for example, a differential amplifier which amplifies signal components that are below or above a respective threshold value. The synchronization signal slicer 120 is coupled to receive its threshold potential from a digital to analog converter (DAC) 118. This potential is generated in response to a data value provided by microcontroller 138.

The data slicer 126 is also coupled to receive a threshold potential, this potential being provided by a (DAC) 124 which is coupled to receive a different digital threshold value from the microcontroller 138.

The operation of the sync slicer 120 and data slicer 126 are illustrated in FIG. 3. The curve CV represents a composite video signal having a horizontal sync pulse, HS, and a color reference burst component, B. The clock run-in signal is shown between times T2 and T3. In an actual composite video signal, the clock run-in signal is a sinusoidal signal, it is shown here as a square wave signal for the sake of convenience. The portion of the composite video signal between times T3 and T4 is the start bit pattern. This pattern is read least significant bit to most significant bit, thus the start bit pattern shown in FIG. 3 is b'100'. The portion of the composite video between times T4 and T5 is the close-caption data portion of the signal.

The synchronization signal slicer 120 operates by comparing the voltage of the reference level to the input signal and transitions occur whenever the input signal level crosses the reference level. In the exemplary embodiment, the reference level here is the potential $P_S$ provided by the digital to analog converter 118. The data slicer 126, in the same manner, operates by comparing the voltage of the reference level to the input signal and transitions occur whenever the input signal level crosses the reference level. In the exemplary embodiment, the reference level here is the potential $P_D$ provided by the DAC 124. The output signals, NHS, of the sync slicer 120 is shown in FIG. 3 as is the output signal, DS, of the data slicer 126.

Figure 2:
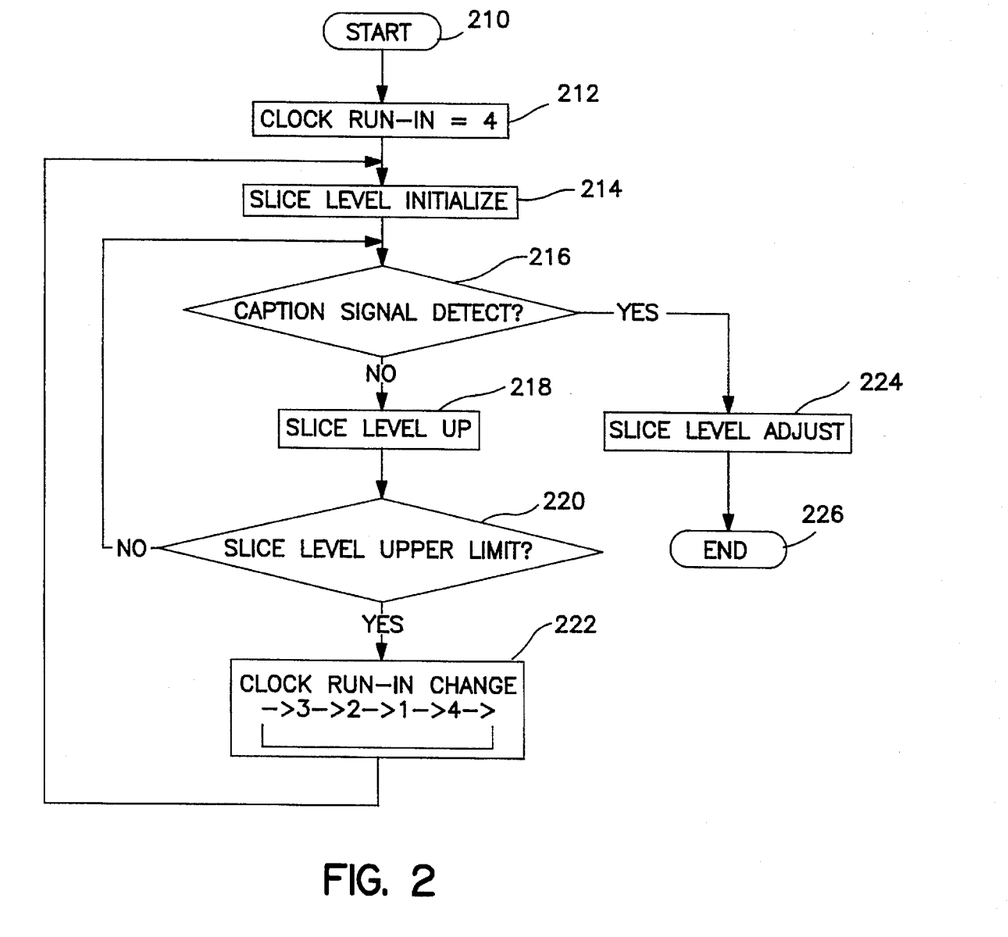
FIG. 2 is a flow chart diagram which illustrates the operation of the microcontroller shown in FIG. 1.

FIG. 2 is a flow-chart diagram which illustrates one technique for how the microcontroller 138 sets the slice level, $P_D$, for the data slicer 126. Briefly, the microcontroller 138 sets a level and then monitors the output signal provided by the clock run in duty shift register 132. When this register indicates that a clock run-in pulse having a predetermined duty cycle has been detected, the microcontroller 138 sets the level for the signal $P_D$ at the level of the last value provided to the DAC 124. Another technique is to monitor the start bit pattern and the parity of the data such that when a correct start bit pattern and correct parity are detected, then a satisfactory slice level has been determined.

The process illustrated by FIG. 2 is run whenever source of the displayed video signal changes. This occurs, for example, when a new channel is selected. Since channel selection is controlled by the microcontroller 138, it can invoke the process at step 210 immediately after implementing the command to change the channel.

Once the process shown in FIG. 2 has been invoked, the first step, step 212, sets the starting clock run-in pulse to be the fourth pulse. This is accomplished by sending a command to the clock run-in detect circuit 130, which is described in detail below with reference to FIG. 6. At step 214, the slice level is set to an initial value. This value may be, for example, less than a nominal expected value for the slice level.

Figure 4:
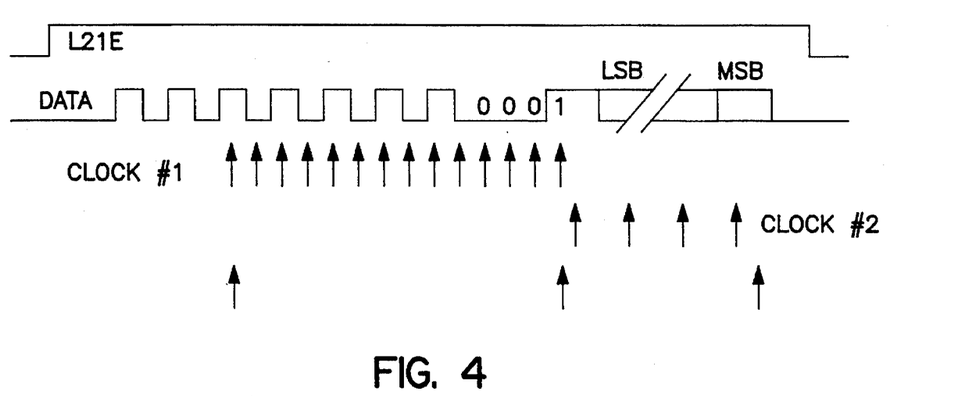
FIG. 4 is a timing diagram which is useful for describing the operation of the sampling clock circuitry shown in FIG. 1.

At step 216, the output signal provided by the clock run-in shift register 132 is monitored to determine if a valid clock run-in pulse has been detected. In the exemplary embodiment of the invention, a valid clock run-in pulse will have a fifty-percent duty cycle as illustrated in FIG. 4. If a valid run-in pulse was detected at step 216 then, at step 224, the last slice level is transmitted to the DAC 124 as the slice level to be used for all decoding operations.

If, at step 216, a valid run-in pulse was not detected, step 218 is executed. This step increases the slice level applied to the DAC 124. If, at step 220, the slice level is less than a predetermined upper limit, control is transferred to step 216 and the output signals produced by the clock run-in duty shift register are monitored to determine if a valid run-in pulse has been detected.

If, at step 220, the slice level is determined to be at its upper limit, then step 222 is executed which changes the first clock run-in pulse that the clock run-in detect circuit attempts to detect. This pulse changes in the sequence 4, 3, 2, 1, 4, etc. Once the value of the first clock run-in pulse has been changed, control is transferred to step 214 to attempt to establish a data slice level, $P_D$, which allows the circuitry 132 to detect a valid clock run-in pulse and caption data.

As described above, the first clock run-in pulse is changed by the step 222 in order to compensate for distortion in the data immediately following the horizontal sync pulse. Exemplary distortion for which this circuit compensates is caused by descrambling circuits used to decode protected cable and satellite transmissions. One method that is commonly used is to "scramble" the signal by inverting the horizontal sync pulse. When the sync pulse is re-inverted by the decoding circuitry, the video signal in an area surrounding the horizontal sync pulse is affected. This decoding circuitry may, for example, distort one or more of the clock run-in pulses. The exemplary embodiment of the invention compensates for this type of distortion by allowing one of four pulses to be detected as the first clock run-in pulse.

Referring back to FIG. 1, the signal DS is applied to a data filter 128. Filter 128 digitally samples the signal DS at a rate of 12 MHz and produces an output signal which only changes state from logic low to logic high or from logic high to logic low if three out of four consecutive samples have the new state. This filter effectively eliminates data signal components having frequencies greater than 2 MHz. In addition, the filter 128 cleans up the negative going and positive going edges of the data signal to remove any multi-path distortion components and any "ringing" distortion which may have been introduced by the data slicer 126. The data filter 128 produces an output signal DATA which is processed by the circuitry shown in FIG. 1 as described below.

The output signal of the synchronization signal slicer 120, the signal NHS, is applied to horizontal synchronization signal detection circuitry 122. The detector 122 is also coupled to receive a signal Flyback HSYNC. The circuitry 122 may, for example, sample the signal NHS and count the number of samples representing each horizontal synchronization pulse in order to ensure that the signal NHS represents a valid horizontal synchronization signal.

In addition the circuitry 122 may time the difference between the Flyback HSYNC signal and the horizontal synchronization pulse to ensure that the clamp pulse is applied to the composite video signal at the proper time. As described above, it is desirable to apply this pulse when the composite video signal is at its blanking level. This may be, for example, during the back porch portion of the horizontal synchronization signal.

The circuitry 122 provides information on the relative timing of the horizontal synchronization pulse and the Flyback HSYNC pulse to the microcontroller 138 via a 4 bit signal applied to the data bus DB. Responsive to this signal, the microcontroller 138 commands the clamp pulse generator 116 to provide the clamp pulse at one of four predetermined delay intervals with respect to the Flyback HSYNC pulse. This command is provided via a two bit link from the bus DB to the clamp pulse generator 116.

The Flyback HSYNC signal is also applied to Field Detect and Enable circuitry 140. Circuitry 140 is also responsive to a signal Flyback VSYNC. The signal Flyback VSYNC is generated by the vertical deflection circuitry of the television receiver. It may be provided, for example, by the output signal of one of the vertical deflection driver stages. The circuitry 140 may include a clocked counter (not shown), which measures the timing difference between the occurrence of the Flyback HSYNC pulse and the Flyback VSYNC pulse.

As is well known, during odd fields, the Flyback HSYNC pulse will occur one horizontal line before the vertical synchronization pulse. On even fields, however, the flyback HSYNC pulse will occur with a delay of one-half line interval before the vertical synchronization pulse. Thus, the circuitry 140 can determine the odd field as the one having a longer delay between the Flyback HSYNC pulse and the Flyback VSYNC pulse.

Information on the delay between individual Flyback HSYNC and Flyback VSYNC pulses is provided by the circuitry 140 to the microcontroller 138 via a five-bit data path to the bus DB. Microcontroller 138 analyzes this data and sends a signal back to the circuitry 140 which causes the circuitry to change the state of a field enable signal (FE) when an odd field is detected. The signal FE is applied, in turn, to programmable line selector circuitry 142. The circuitry 142 is also coupled to receive the clamp pulse CP, provided by the clamp pulse generator 116. In addition, the circuitry 142 receives a six-bit control signal from microcontroller 138 and provides a signal L21T to data bus DB for use by microcontroller 138 in monitoring the performance of the programmable line selector 142. The main output signal of the line selector circuitry 142, however, is the line 21 enable signal, L21E. This signal is shown in FIG. 4.

Figure 5A:
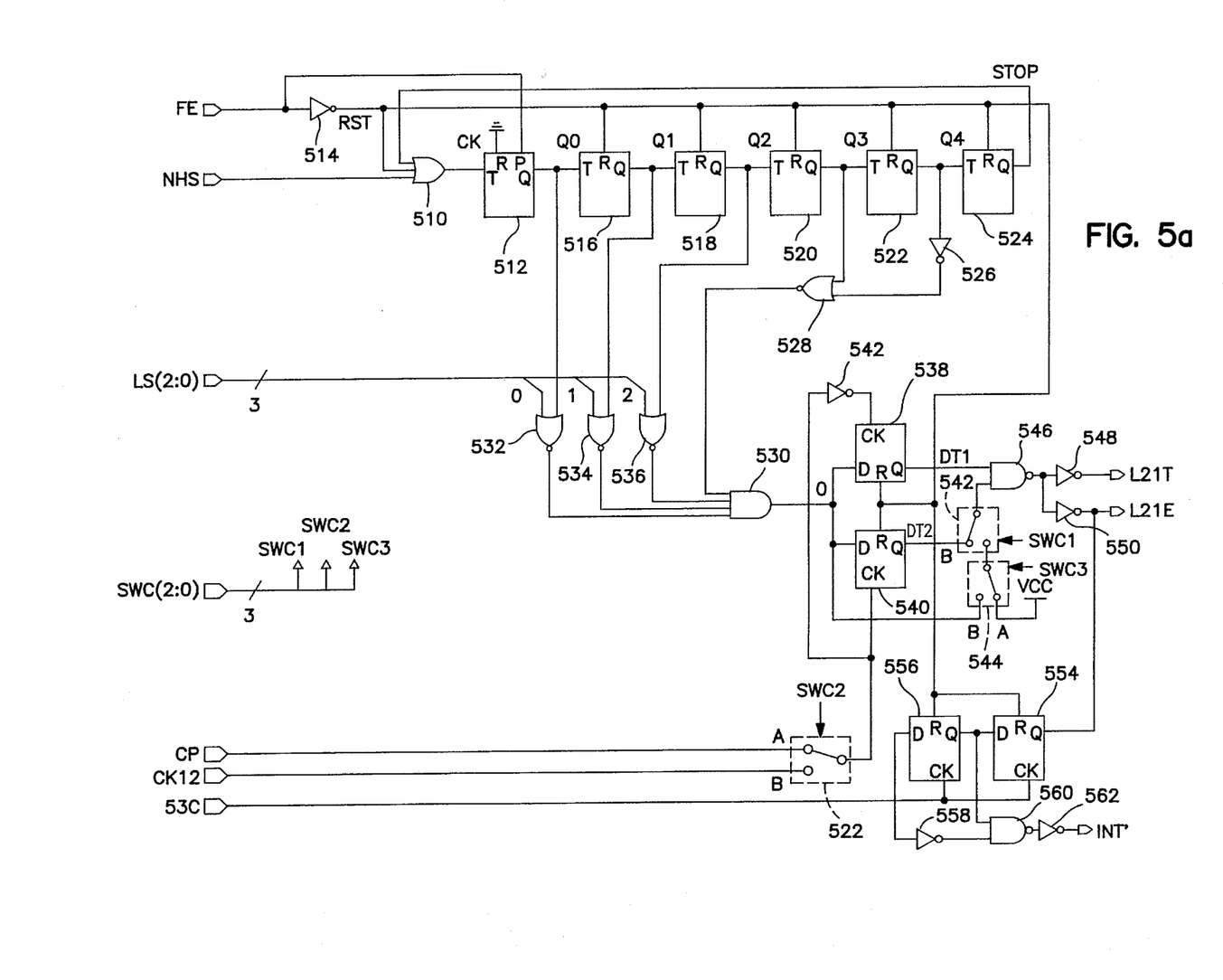
FIG. 5a is a logic schematic diagram of circuitry suitable for use as the line 21 detector shown in FIG. 1.

FIG. 5a is a logic schematic diagram of circuitry suitable for use as the programmable line selector 142. In FIG. 5a, the field enable signal, FE, is applied to an inverter 514 to generate a reset signal, RST. The signal is applied to many of the flip-flops in the circuit to hold the circuit in a reset state during the even field. The line selector circuitry 142 also receives the horizontal synchronization pulse signal NHS, provided by the sync slicer 120.

When the signal FE is logic high (i.e. during an odd field), the signal RST is logic low and so the logical OR of the signal NHS and RST, as provided by the OR gate 510, is equivalent to the signal NHS. The output signal of the OR gate 510 is applied to a counter formed from cascade-connected trigger type flip-flops 512, 516, 518, 520, 522, and 524. The output signal, STOP, of flip-flop 524 is coupled to one input of the OR gate 510 to disable the counter when 31 horizontal sync pulses have been counted.

In trigger flip-flop 512, the reset input terminal is coupled to ground and the signal FE is applied to the preset input terminal. Thus when the counter is enabled, its initial value is one. The first horizontal sync pulse produces a count value of two, the second horizontal sync pulse produces a count value of three, and so on up to the 31st horizontal sync pulse which produces a count value of 32. This count value causes the signal STOP to become logic high and disable the counter.

The output signals of the flip-flops 512, 516, 518, 520 and 522 are coupled to circuitry which decodes the value held in the counter to select a particular line as the enabled line. The output signal, Q3, of flip-flop 520 is coupled to one input of a NOR gate 528. The other input of the NOR gate 528 is coupled to receive the inverted output signal of flip-flop 522, as provided by inverter circuit 526. The output signal of NOR gate 528 is applied to one input terminal of an AND gate 530. This signal will be in a logic high when signal Q3 is logic low and signal Q4 is logic high. The output signals Q0, Q1, and Q2 of flip-flops 512, 516 and 518 respectively are coupled to respective input terminals of exclusive NOR gates 532, 534 and 536. The second input terminals of each of these exclusive NOR gates are coupled to receive respectively different ones of three control signals provided by the microcontroller 138. Responsive to these control signals, any line between line 15 and line 22 may be selected as the enabled line. The correspondence between the line select signals LS0 LS1 and LS2 and the selected line is shown in Table 1.

TABLE 1

| LS2 | LS1 | LS0 | Horizontal Line | Counter Value |
|---|---|---|---|---|
| 0 | 0 | 0 | 15 | 10000 |
| 0 | 0 | 1 | 16 | 10001 |
| 0 | 1 | 0 | 17 | 10010 |
| 0 | 1 | 1 | 18 | 10011 |
| 1 | 0 | 0 | 19 | 10100 |
| 1 | 0 | 1 | 20 | 10101 |
| 1 | 1 | 0 | 21 | 10110 |
| 1 | 1 | 1 | 22 | 10111 |

As shown in the table, line 21 is selected when each of the line select signals LS1 and LS2 is a logic high and the signal LS0 is a logic low. In this state, when the horizontal sync pulse for line 22 is detected, the output signal of the AND gate 530 becomes logic high. This signal is applied to the D input terminal of two flip-flops 538 and 540. These flip-flops have complementary clock signals which are provided by a switch 522 in response to a switch control signal, SWC2, provided by the microcontroller 138.

The output signal of flip-flop 538 is coupled to one input terminal of a NAND gate 546. The other input terminal of the NAND gate 546 is coupled to receive one of three possible signals as determined by switches 542 and 544 under control of the switch control signals SWC1 and SWC3, also provided by the microcontroller 138. The operation of the switches 522, 542 and 544 is described below with reference to FIG. 5b.

The output signal of the NAND gate 546 is applied to inverter 550 to generate the line 21 enable output signal L21E. In addition, this signal is provided through a second inverter 548 to produce a test signal L21T which is used by the microcontroller 138 for diagnostic purposes.

In the circuitry shown in FIG. 5a, the signal L21E is applied to a two-stage shift register formed by flip-flops 554 and 556. The output signal of flip-flop 554 is coupled to one input terminal of a NOR gate 560. The output signal of flip-flop 556 is coupled through an inverter 558 to a second input terminal of the NOR gate 560. The output of the NOR gate 560 is coupled through an inverter 562 to produce the active low interrupt control signal INT. This signal is applied to the microcontroller 138 when valid data has been loaded into the shift register 136. In response to this signal, the microcontroller 138 reads the closed-caption data from the shift register 136, as described below.

During the even field interval, flip-flops 556 and 554 are held in the reset state by the signal RST. Since the output signal of flip-flop 556 is logic low, the output signal of inverter 558 is logic high and thus the output signal of inverter 562 is also logic high.

During the odd field interval, when the signal L21E becomes logic high, the output signal of flip-flop 554 becomes logic high on the next pulse of the clock signal S3C, causing the signal INT to remain logic high. One clock period after the end of the L21E pulse, the output signal of flip-flop 554 is logic low and the output signal of flip-flop 556 is logic high. This causes the interrupt signal INT to become logic low, interrupting the microcontroller 138.

Figure 5B:
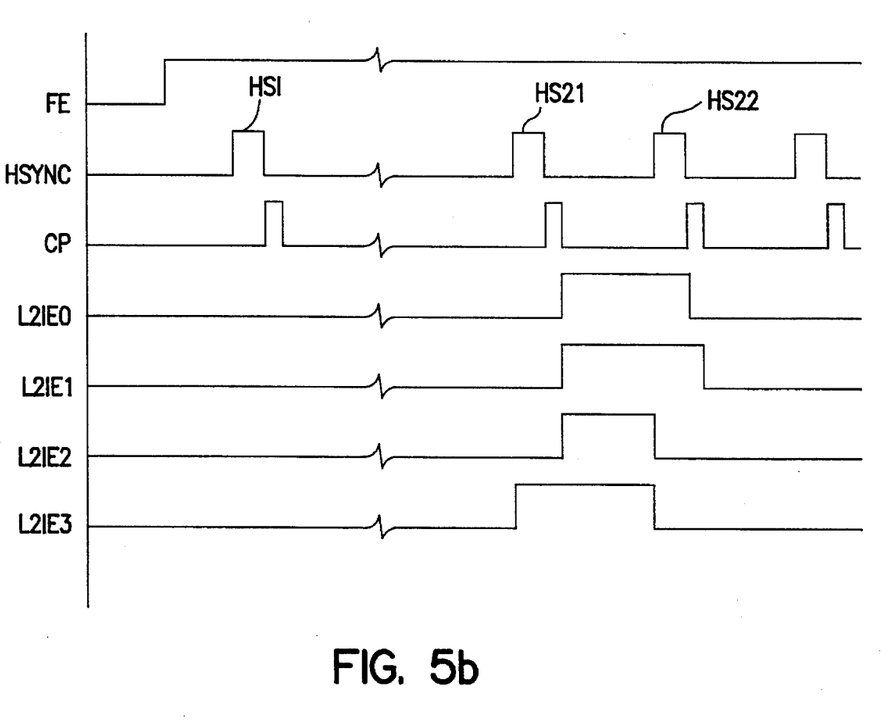
FIG. 5b is a timing diagram which shows various versions of the signals produced by the circuit in FIG. 5.

As described above, the switches 522, 542, and 544 control the instants at which the L21E pulse begins and ends. This control function is illustrated in FIG. 5b. Switch 522 is controlled by the signal SWC2 to provide either the clamp pulse CP or a 12 MHz clock signal, CK12, as the clock signal for the flip-flops 538 and 540. Switch 544 is controlled by the signal SWC to provide either the output signal of the AND gate 530 or a potential (e.g. VCC) representing a logic high at its output terminal. Switch 542 is controlled by the control signal SWC1 to provide either the output signal of flip-flop 540 or the output signal of switch 544 as the second input signal of the NAND gate 546.

The flip-flops 538 and 540 form a programmable delay for the signal L21E. Depending on the position of switch 542, the signal L21E may be delayed until the start of a pulse of the clock signal provided by switch 522 or until the negative going transition of that clock signal. Switch 522 is configured to provide either a 12 MHz clock signal or the clamp pulse as the clock signal for the flip-flops 538 and 540. Accordingly, the delay element formed by the flip-flops 538 and 540 may delay the L21E signal by essentially zero with respect to the output signal provided by the AND gate 530 or it may delay the L21E signal until the instant corresponding to the negative going transition of the next clamp pulse CP. Various combinations which produce different L21E signals are shown in FIG. 5b. The different L21E signals may be selected to avoid noise problems in the NHS signal. The switch control signals SWC1, SWC2, and SWC3 which produce these L21E pulses are shown in Table 2.

TABLE 2

| SWC1 | SWC2 | SWC3 | L21E |
|---|---|---|---|
| B | A | X | L21E0 |
| A | A | A | L21E1 |
| A | A | B | L21E2 |
| B | B | B | L21E3 |

Using the L21E signal, the clock run-in detect circuitry 130 generates a STRT signal which indicates when the sampling clock 134 should begin operating. Briefly, the sampling clock 134 for the closed-caption data is synchronized to the positive edges of the clock run-in signal. In the exemplary embodiment of the present invention, four choices are available for selecting which one of the first four positive edges of the clock run-in signal is used for synchronizing the sample clock. These four choices have been supplied to avoid potential problems associated with poor signal quality and distortion of the composite video signal. The clock run-in detect circuitry 130, which is enabled when the L21E signal is in a logic high state, detects when the selected edge of the clock run-in signal occurs.

Figure 6:
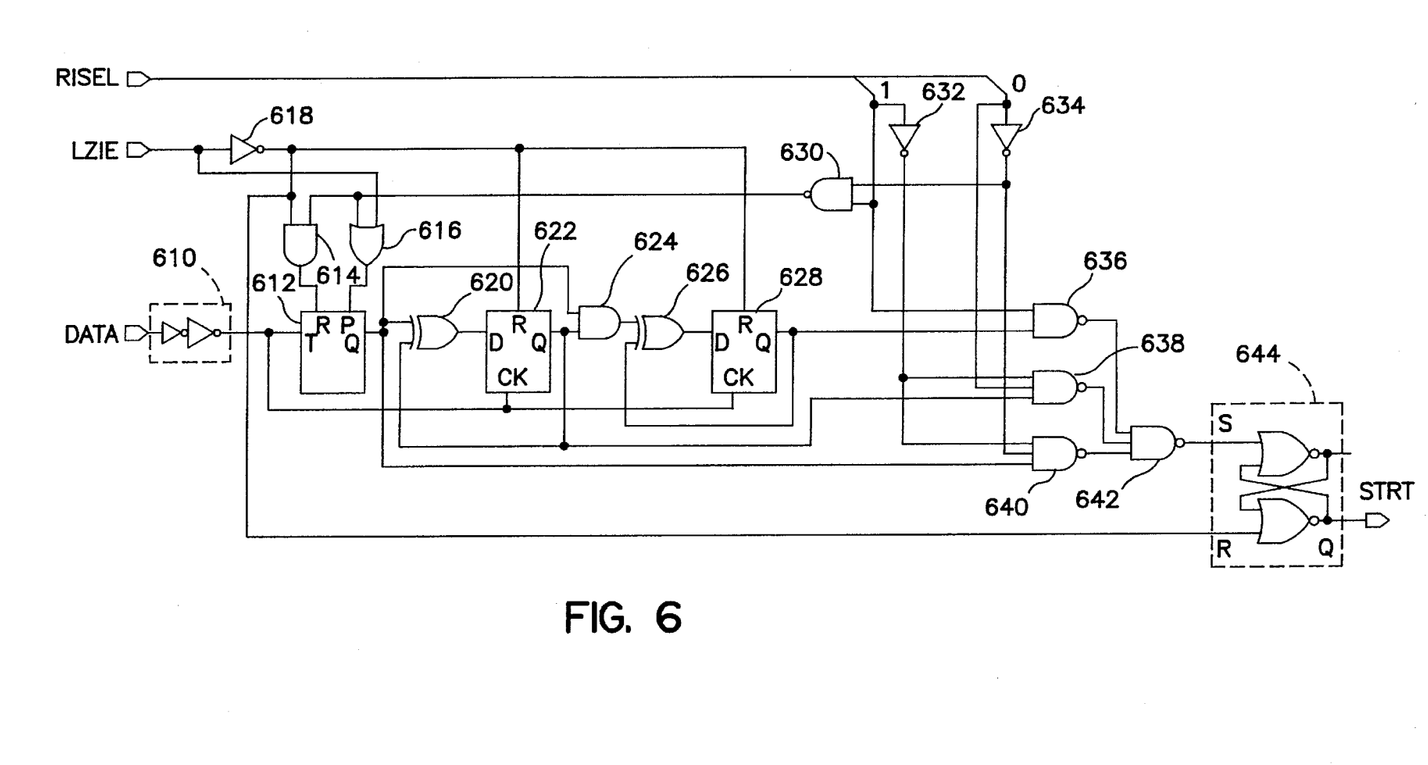
FIG. 6 is a logic schematic diagram of circuitry suitable for use as the clock run-in signal detect circuit shown in FIG. 1.

FIG. 6 shows a logic schematic which illustrates how the clock run-in detect circuitry 130 is implemented. Clock run-in detect circuitry 130 is responsive to a two bit run-in select (RISEL) signal, the L21E signal and the DATA signal. The two bit RISEL signal is provided by microcontroller 138 for selecting which one of the first four edges of the clock run-in signal will be used for synchronization.

As shown in FIG. 6, a three bit counter comprising flip-flops 612, 622 and 628 is used to track the transitions of the clock run-in signal provided by the DATA signal input. Decoding circuitry comprising NAND gates 636, 638, 640 and 642 is used, in conjunction with the two bit RISEL signal, to select which clock run-in pulse to key on. When the selected edge of the clock run-in signal occurs, the S-R latch 644 is set, generating the STRT signal which instructs the sampling clock circuitry 134 to begin operating.

For example, if the second leading edge of the clock run-in signal was selected for synchronization, the RISEL signal is b'01' and the trigger flip-flop 612 is initialized to 0. Once the L21E signal goes to a logic high state, the three-bit counter is enabled. As the clock run-in pulses are applied to the CLK input terminal of flip-flop 612, the output of trigger flip-flop 612 sets the Q output of flip-flop 622 to a logic high state. When this occurs, all three inputs to NAND gate 638 are logic high which places a logic low state at an input to NAND gate 642. Upon receiving a logic low input, NAND gate 642 outputs a logic high signal which sets the S-R latch 644 and activates the STRT signal. It should be noted that the STRT signal is reset when L21E goes to the logic low state.

As seen from the Reset and Preset inputs to register 612, the least significant bit of the three-bit counter is generally initialized to a 0; however, when the edge of the third clock run-in pulse is selected (RISEL is b'10'), the least significant bit of the counter is initialized to a 1. This allows NAND gate 636 to require only two inputs, thus, when the output of flip-flip 628 goes to a logic high state, the S-R latch 644 is set whether the third or the fourth clock run-in pulse is selected. Otherwise, by way of inverter 618 and the respective Reset inputs, the L21E signal holds flip-flops 622 and 628 in a reset state when L21E is in a logic low state.

Some advantages of the exemplary implementation include 1) glitch-free decoding which avoids output glitches that might accidently set the R-S latch 644 on a non-selected edge, and 2) a propagation delay from the DATA signal to the STRT which is significantly less than half of the period of the 12 MHz clock (41.6 nanoseconds= 83.3 nanoseconds/ 2). This is important because if it was to close to half of the period, the next active clock edge could be missed.

It should be noted that a ripple counter was not used because, in the exemplary embodiment, the increased delay would have further reduced the timing margin for providing a signal to the sampling clock circuitry 134.

Figure 7A:
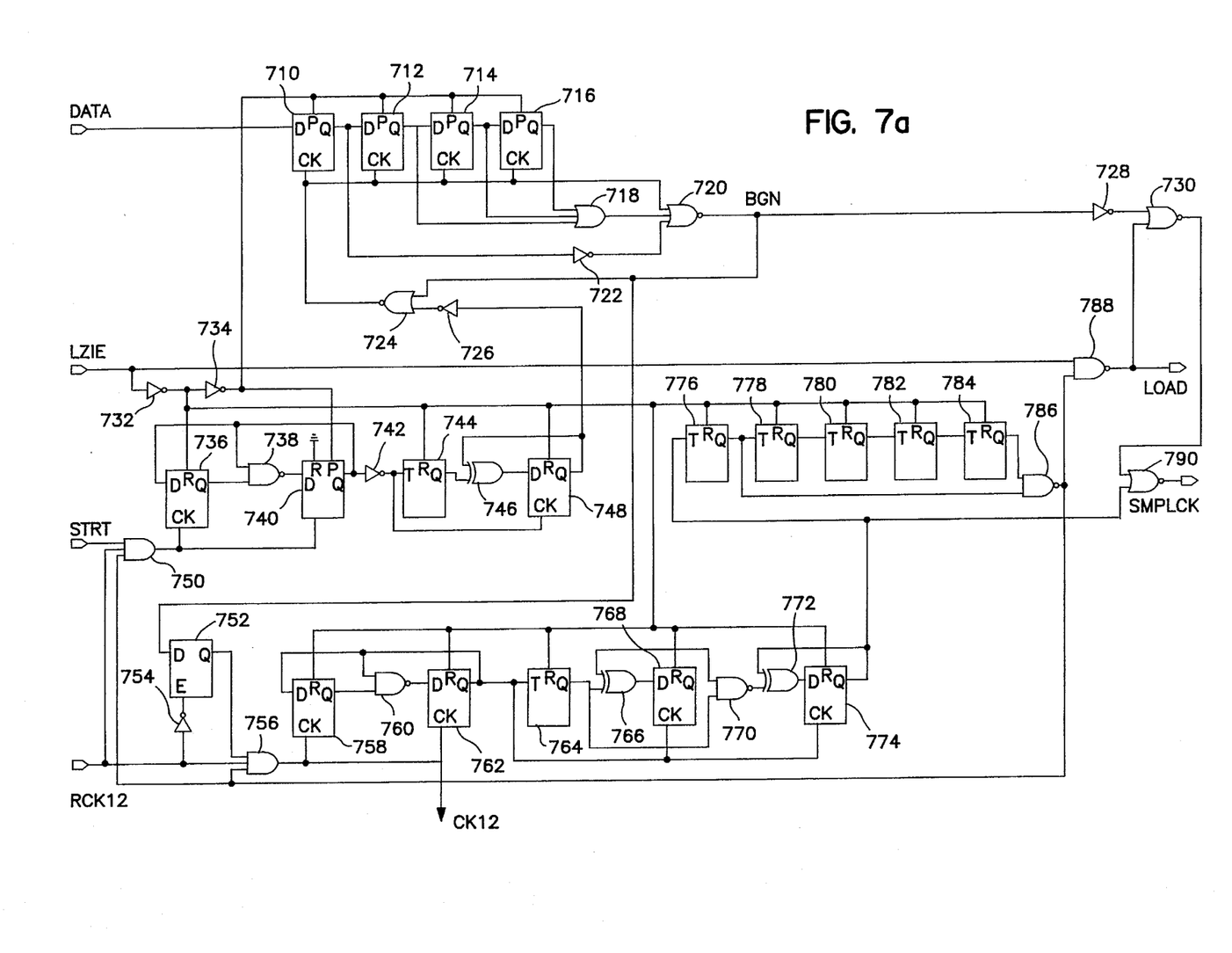
FIG. 7a is a logic schematic diagram of circuitry suitable for use as the sampling clock generator shown in FIG. 1.

The STRT signal generated by the clock run-in detect circuitry 130 is used by sampling clock circuitry 134 to synchronize the clock which triggers the flip-flops used to capture the closed-caption data. FIG. 7a shows a logic schematic which illustrates circuitry suitable for use as the sampling clock circuitry 134.

As seen in FIG. 7a, the sampling clock circuitry 134 includes four sub-circuits: the first generates a first clock at 1 MHz for clocking the circuitry which detects the start bit pattern, the second generates a second clock at 500 KHz for clocking the shift register which captures the closed-caption data, the third detects the start bit pattern and the fourth is closed-caption data counter for determining when a valid data stream has ended.

The circuitry for the first clock generation includes flip-flops 736, 740, 744 and 748 as well as NAND gate 738, inverter 742, EXOR gate 746 and AND gate 750. This circuitry, responsive to the STRT signal and a 12 MHz clock signal (RCK12), generates a 1 MHz clock which is synchronized to the leading edge of the selected clock run-in pulse. The 1 MHz clock is generated by combining a divide-by-three circuit (736-740) with a frequency divide-by-four circuit (744-748). This 1 MHz clock is used to clock the flip-flops 710, 712, 714 and 716 included in the start bit pattern detect circuitry.

The start bit pattern detect circuitry not only includes shift register (flip-flops 710-716) but also decoding circuitry 718, 720 and 722 which is designed to detect a b'1000' pattern captured in the shift register. The start bit pattern is actually b'100', but the first clock circuitry samples at twice the frequency of the data. When a b'1000' is detected by the start bit pattern detect circuitry, it generates a begin (BGN) signal via NOR gate 720 to enable the second clock generation circuitry.

The second clock generation circuitry generates a 500 KHz clock used to sample the closed-caption data and includes flip-flops 752, 758, 762, 764, 768, AND gate 756 and 770, NAND gate 760 and exclusive OR gates 766 and 772. In this case, a divide-by-three circuit (758-762) along with a frequency divide-by-eight circuit (764-774) are used. Flip-flop 752, which delays the BGN signal (second clock generation enable), is used to avoid a race condition between the BGN signal and the RCK12 signal. The BGNs signal is ANDed with RCK12 by logic gate 756 which provides the clock signal to the remainder of the second clock generation circuitry including the divide-by-three circuit (758-762) and the frequency divide-by-eight circuit (764-774).

The 500 KHz signal generated by the second clock generation circuitry is then used to clock the closed-caption data counter which includes flip-flops 776, 778, 780, 782, 784 and NAND gate 786. This 5-bit counter (one start bit and 16 data bits) counts to 16 (16 cycles being the time necessary to capture the 2 bytes of closed-caption data) then disables the sampling clock circuitry. At this point, by way of the SMPLCK signal provided to shift register 136, all of the closed caption data bits have been stored into the 16 bit shift register. The output signal provided by the 5-bit closed-caption data counter also instructs, via the LOAD signal, the shift register 136 to down load the captured data values so they can be read by microcontroller 138.

Although two separate clock generation circuits are used in the exemplary embodiment, it should be noted that the first (1 MHz) and second (500 KHz) clocks could have been combined to reduce the circuitry; however, by separating them into two separate clock generation circuits, several advantages were attained.

Figure 7B:
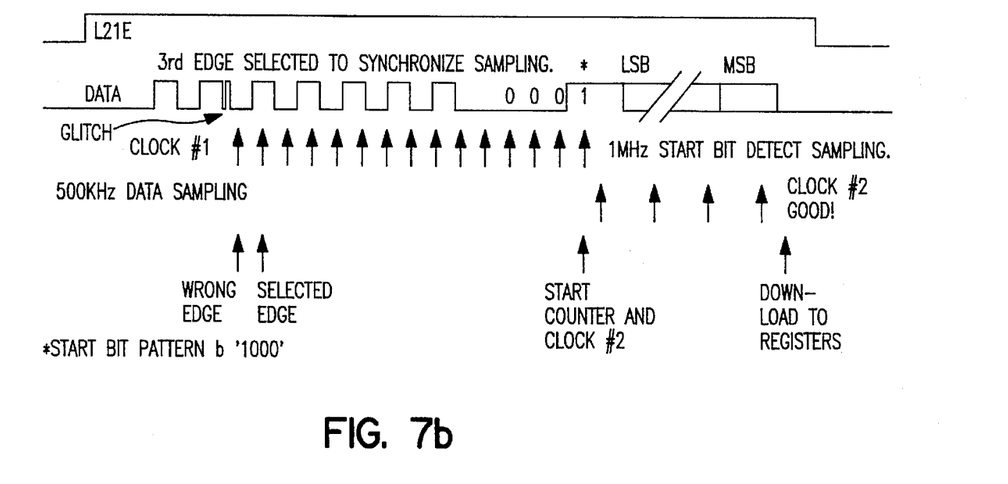
FIGS. 7b is a timing diagram illustrating an advantage for using separate circuitry for clock generation as shown in FIGS. 7a and 9.
Figure 7C:
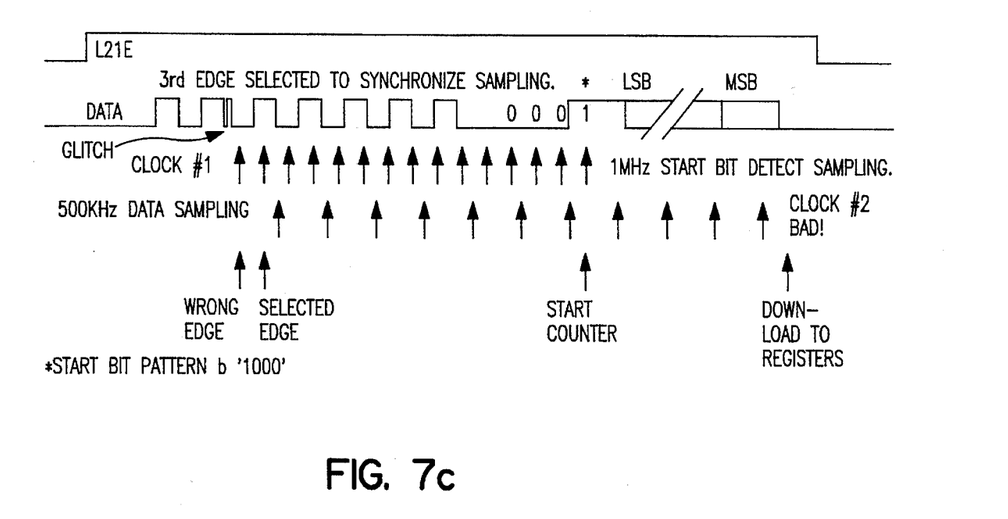
FIGS. 7c is a timing diagram illustrating a potential disadvantage for using combined circuitry for clock generation.

First, if the clock run-in detect circuitry 130, for example, detects the negative edge of the clock run-in signal (because of a glitch caused by noise), the first clock signal (1 MHz) would start sampling one micro second out of phase. As seen in FIG. 7b, this does not introduce an error into the 1 MHz sampling points.

Additionally, because the second clock signal does not start until after the start bit pattern has been detected, the 500 KHz sampling clock is also not affected. If the first and second clocks had not been separated, as seen in FIG. 7b, the 500 KHz sampling timing would have been 1 microsecond out of phase resulting in poor sampling times.

Second, the first and second clock generation circuits generate frequencies of 1 MHz and 500 KHz. The ideal sampling frequencies for the start bit pattern and the closed-caption data are 1.006976 MHz and 503.488 KHz, respectively. This slight difference between the actual and ideal sampling frequencies, given enough time, could cause the sampling clocks to drift far enough such that data may go unsampled and erroneous results are produced.

Figure 8A:
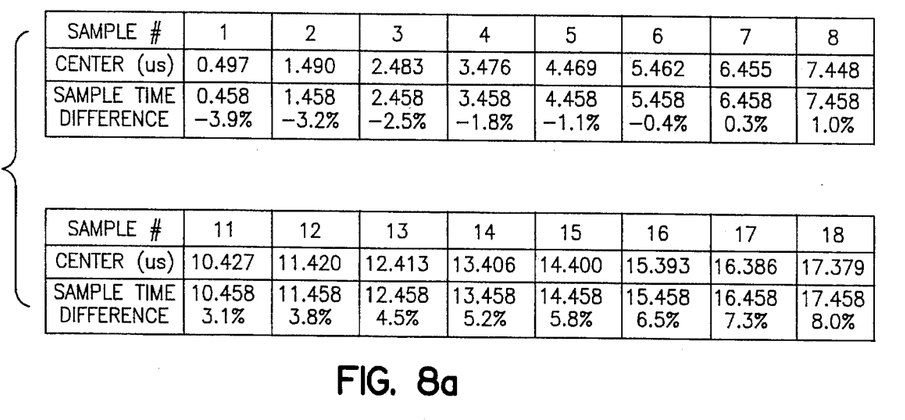
FIG. 8a is a table illustrating a difference between the clock run-in signal and the 1 MHz sampling positions.

FIG. 8a is a table illustrating the difference between the center points of the clock run-in signal and the 1 MHz sampling clock. The numbers set forth in FIG. 8a are based on a first edge selection which presents a worst case scenario. As seen from the progression of samples, the sampling is initially off center, in the negative direction, by 3.9%; then, after only 18 samples, the sampling is off center by 8% in the positive direction. Although not reflected in the table of FIG. 8a, an additional error of ±4.2% exists.

Figure 8B:
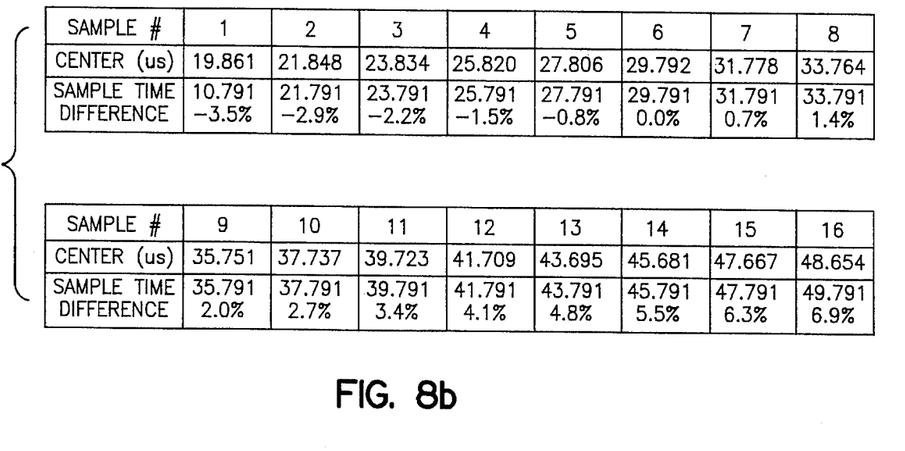
FIG. 8b is a table illustrating a difference between the closed-caption data and the 500 KHz sampling positions.
Figure 8C:
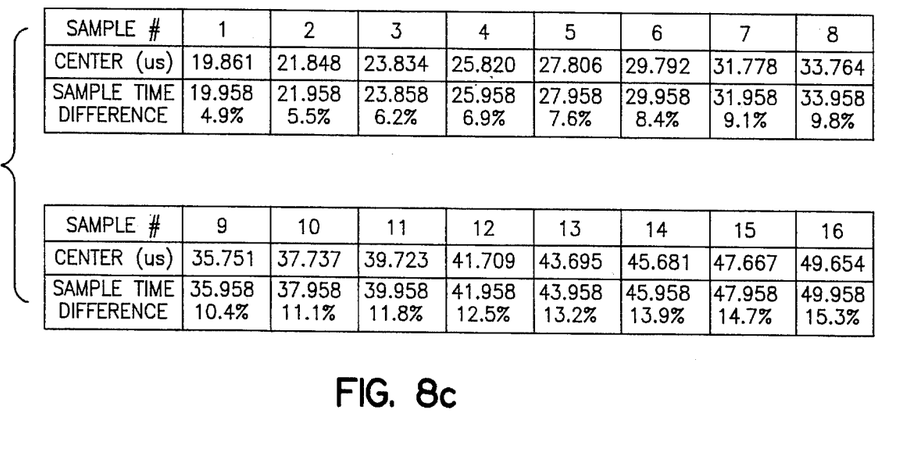
FIG. 8c is a table illustrating what the differences of FIG. 8b are if the 1 MHz clock and the 500 KHz clock are combined.

Clearly, if the first and second clock generation circuits were combined, the error introduced into the sampling of the 500 KHz clock would be compounded by the initial drift of the 1 MHz clock. Since the clocks are generated separately, however, the drift of the 500 KHz clock does not begin until enabled by the BGN signal. FIGS. 8b and 8c are tables which respectively show the difference between the closed-caption data and the sampling positions when the sampling clock is separate from the 1 MHz clock and when it is combined with the 1 MHz clock.

Figure 9:
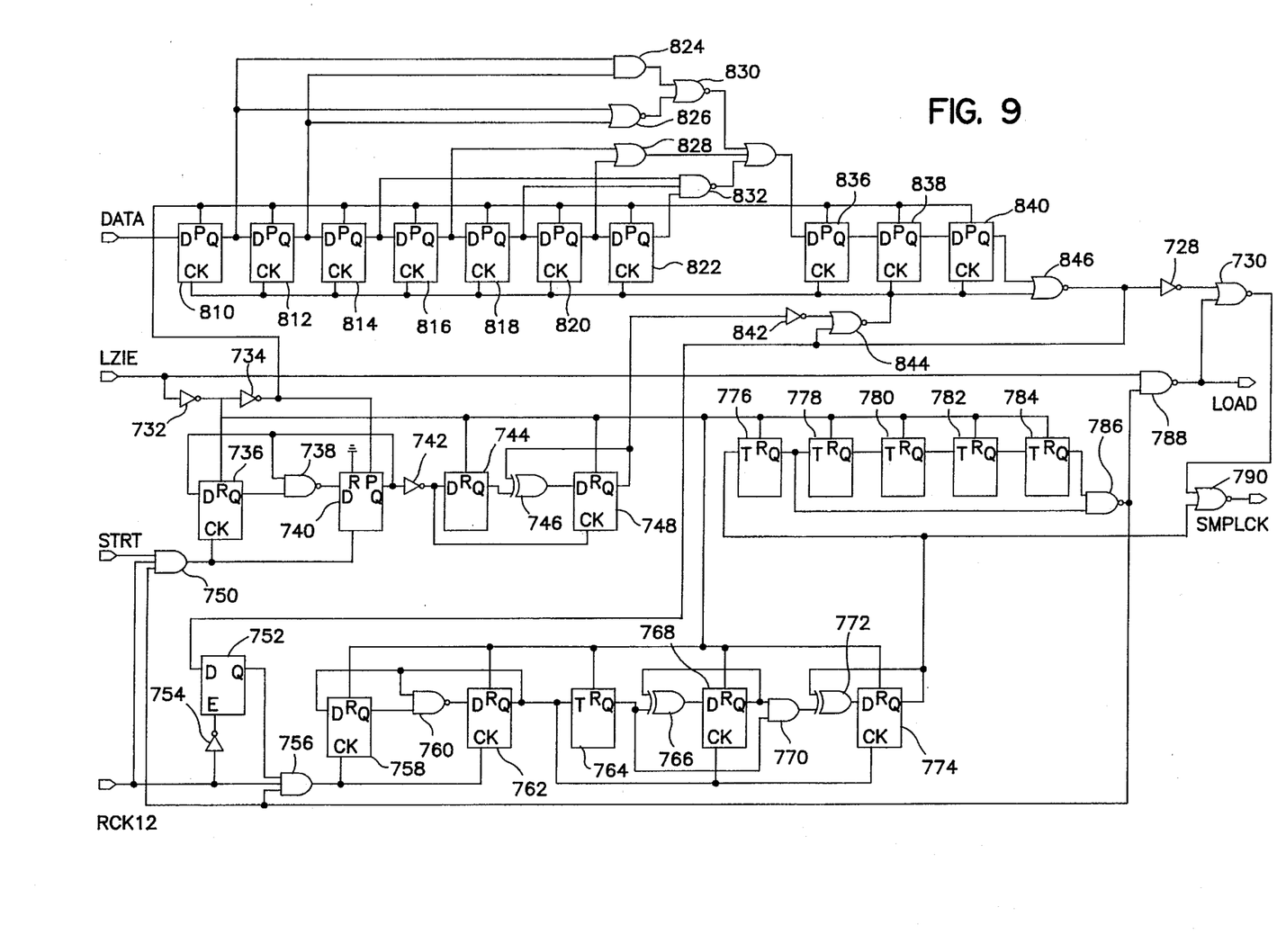
FIG. 9 is a logic schematic diagram of alternative circuitry suitable for use as the sampling clock generator shown in FIG. 1.

Although, in the exemplary embodiment of the present invention, the start bit pattern is designated as b'100', it is contemplated that different start bit patterns could be used. In this case, an alternate embodiment of the sampling clock generation circuitry 134 suitable for use with any start bit pattern is illustrated in FIG. 9. As shown in FIG. 9, the first and second clock generation circuits as well as the 17 bit counter are the same as illustrated in FIG. 7a. However, instead of dedicating four flip-flops and several logic gates to detect the pattern b'1000', a group of flip-flops 810–822 and a 3 microsecond delay are used. The flip-flops 810–822 along with decoding circuitry (logic gates 824–834) detect when a pattern of b'1110101' or b'0010101' occurs. Because this pattern occurs at and includes the end of the clock run-in signal, once detected, the output signal of OR gate 834 triggers the 3 microsecond delay circuitry (flip-flops 836–840) which effectively ignores the remainder of the start bit pattern time. This alternate approach provides the same timing accuracy as the exemplary embodiment.

It should be noted that although the invention is described using the terms "odd" and "even" fields, if necessary either field could be used. Therefore, in general, the odd and even fields of the exemplary embodiment can be described as being the selected and non-selected fields, respectively.

Although the invention is illustrated and described herein as embodied in a system for synchronizing a closed-caption data decoder, the invention is not intended to be limited to the details shown. Rather, various modifications may be made in the details within the scope and range of equivalents of the claims and without departing from the spirit of the invention.

What is claimed:

1. A closed-caption data decoder comprising:

line detecting means for detecting which of a plurality of lines of a video signal contains information including and relating to closed-caption data and producing an output signal indicative of the detection;

extracting means for extracting the information from the video signal and producing an output;

clock generating means, responsive to the line detecting means output signal and the extracting means output, including first means for generating a sampling clock signal synchronized with the information relating to the closed caption data and second means, independent from the first means, for generating a second sampling clock signal separate from the sampling clock signal; and means, responsive to the sampling clock signal, for capturing the closed-caption data.

2. The decoder of claim 1, wherein the second sampling clock signal has a frequency of 1 MHz.

3. The decoder of claim 1, wherein the sampling clock signal has a frequency of 500 KHz and the second sampling clock signal has a frequency of 1 MHz.

4. The decoder of claim 1, wherein the sampling clock signal has a frequency of 500 KHz.

5. The decoder of claim 1, wherein the information includes a plurality of clock run-in pulses, a start bit pattern and closed-caption data.

6. The decoder of claim 5, wherein the sampling clock signal is synchronized as a function of a leading edge of a clock run-in pulse.

7. The decoder of claim 6, wherein the leading edge of any one of four different clock run-in pulses is selected for synchronization.

8. The decoder of claim 3, wherein the information includes a plurality of clock run-in pulses, a start bit pattern and closed-caption data and the second means is enabled as a function of a leading edge of a selected clock run-in pulse.

9. The decoder of claim 3, wherein the clock generating means includes a start bit pattern detect means for generating an output signal indicating when a predetermined start bit pattern is detected and wherein the first means is enabled as a function of the start bit pattern detect means output signal.

10. The decoder of claim 1, wherein the sampling clock signal has a frequency other than an ideal frequency for sampling the closed-caption data and the sampling clock signal is aligned with the closed-caption data such that regardless if the sampling clock signal drifts relative to the closed-caption data, the closed-caption data is accurately captured by the means for capturing.

11. The decoder of claim 3, wherein the clock generating means includes a means for synchronizing the sampling clock signal with the information related to the closed-caption data regardless of a predetermined start bit pattern.

12. A closed-caption data decoder comprising:

line detecting means for detecting which of a plurality of lines of a video signal contains information including and relating to closed-caption data and producing an output signal indicative of the detection;

extracting means for extracting the information from the video signal and producing an output;

edge detecting means for detecting a leading edge of a selected signal from the information and producing an output signal;

first clock generating means, responsive to a 12 MHz clock signal, the line detecting means output signal and the edge detect means output signal, for generating a first sampling clock signal synchronized with the information relating to the closed caption data;

means, responsive to the first sampling clock signal, for generating an enable signal indicative of when the closed-caption data exists;

second clock generating means, responsive to the 12 MHz clock signal and the enable signal, for generating a second sampling clock signal synchronized with the information relating to the closed caption data; and means, responsive to the second sampling clock signal, for capturing the closed-caption data.

13. The decoder of claim 12, wherein the second sampling clock signal has a frequency other than an ideal frequency for sampling the closed-caption data and the second sampling clock signal is aligned with the closed-caption data such that regardless if the second sampling clock signal drifts relative to the closed-caption data, the closed-caption data is accurately captured by the means for capturing.

* * * * *

UNITED STATES PATENT AND TRADEMARK OFFICE
CERTIFICATE OF CORRECTION

PATENT NO.   : 5,506,626
DATED        : April 9, 1996
INVENTOR(S)  : Yagi et al.

It is certified that error appears in the above-identified patent and that said Letters Patent is hereby corrected as shown below:

<u>Title page,</u>
Item [73], Assignee, after "Matsushita Electric Industrial Co., Ltd., Osaka, Japan" insert -- Matsushita Semiconductor Corporation of America, Puyallup, Washington --.

Signed and Sealed this

Eighth Day of April, 2003

JAMES E. ROGAN
*Director of the United States Patent and Trademark Office*